(No Model.)
A. B. BLACK.
CART BODY.
No. 599,826. Patented Mar. 1, 1898.
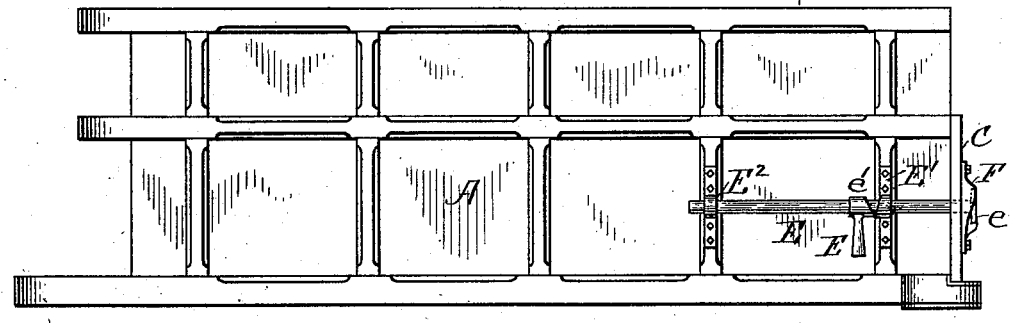
Fig. 1.
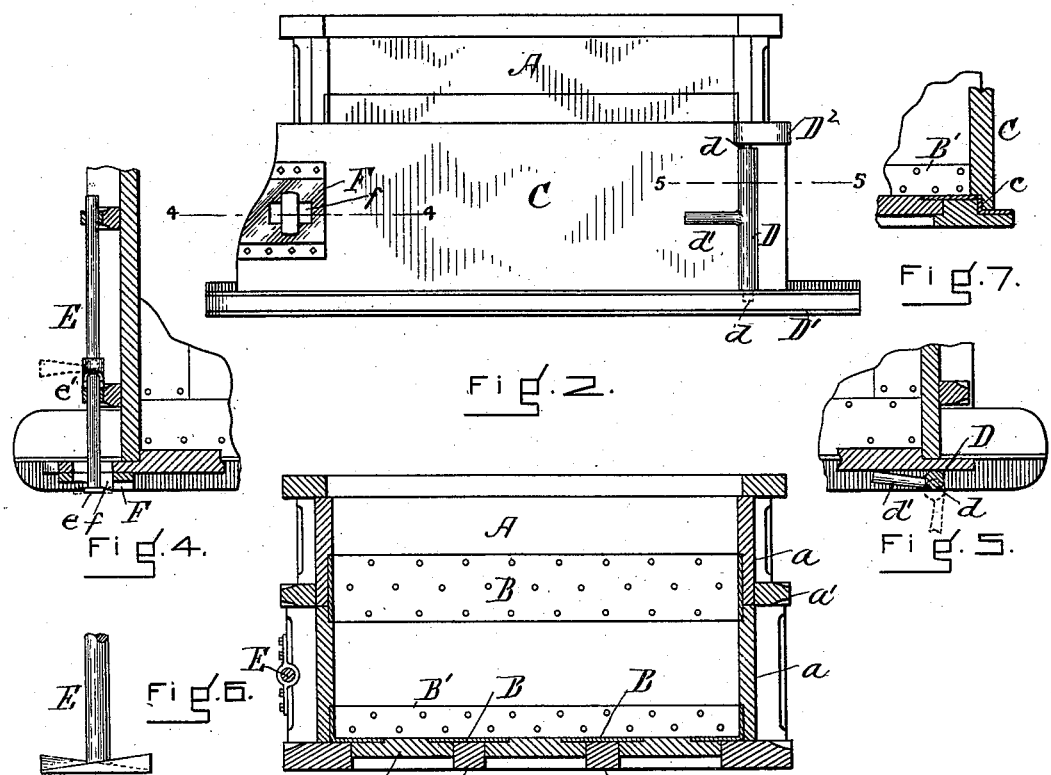
Fig. 2.
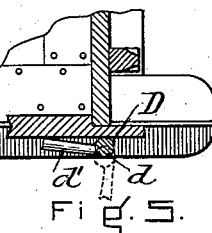
Fig. 7.
Fig. 4.
Fig. 5.
Fig. 6.
Fig. 3.
WITNESSES.
E. A. Guild
L. A. Walsh
INVENTOR:
Albt. B. Black

UNITED STATES PATENT OFFICE.

ALBERT B. BLACK, OF LEXINGTON, MASSACHUSETTS.

CART-BODY.

SPECIFICATION forming part of Letters Patent No. 599,826, dated March 1, 1898.

Application filed May 11, 1897. Serial No. 636,004. (No model.)

*To all whom it may concern:*

Be it known that I, ALBERT B. BLACK, of Lexington, in the county of Middlesex and State of Massachusetts, have invented a new and useful Improvement in Carts, of which the following is a specification.

Wagon and cart bodies, while sometimes water-tight, do not long remain so, for being made entirely of wood (so far as I have seen) the planking swells and shrinks according to the amount of dampness which the wood absorbs, and if the wooden floor is made absolutely tight when the body is dry, when it is wet the floor and side walls swell, and hence become bulgy and are liable to crack and sometimes even spring out of place. When shrinking takes place after this amount of swelling, it is usually found that the joints are imperfectly closed and the cart is no longer water-tight. This of course may not take place until after the cart has been used for some little time, but when it does occur the cart becomes useless for water-tight purposes. My improvement is intended to overcome this fault; and it consists in providing the floor and the walls of the cart-body with strips of sheet-iron or other metal, which overlap the wooden joints, and thus make it possible to so construct the cart that it will be water-tight and at the same time so that the woodwork may expand and shrink without changing the level of the floor or sides.

My improvement also consists in providing a tail-board holder which by reason of its cam-like construction may jam the tail-board as tightly as possible against the rear of the cart-body and so make a practically water-tight joint between it and the tail of the cart.

My invention will be understood by reference to the drawings, in which—

Figure 1 is a side view, and Fig. 2 a rear view, of a cart-body embodying my invention. Fig. 3 is a cross-section on line 3 3 of Fig. 1. Figs. 4, 5, 6, and 7 are sectional details, Fig. 4 being a section on line 4 4 of Fig. 2, Fig. 5 being a section on line 5 5, and Fig. 6 a modification of one of the tail-board holders, and Fig. 7 a section on line 7 7 of Fig. 2.

A is the wagon-body, which consists of a floor, sides, and front made of planking in the ordinary shape and manner, except that where the edges of the planks $a$ abut against each other or against sills $a'$ the joint is covered by a metallic strip B, which is countersunk into the abutting portions, as will be clearly understood from Fig. 3. This construction is also carried out at the joining of the walls of the cart with the floor, as will also be seen from Fig. 3, metallic angle-strips B' being provided for this purpose. The metallic strips in each case are suitably attached to the woodwork. Being countersunk, they have a smooth water-tight finish, but allow a certain amount of expansion and contraction without changing the water-tight character of the cart. The tail-board C is constructed in the same manner with a metallic strip $c$ at the bottom, the bottom being channeled and the end of the floor of the cart being also channeled, so that they will fit together, as shown in Fig. 7. The tail-board is held in place by cam connections, which are convenient also for use in other kinds of carts.

In place of the ordinary tail-board pin, between which and the end of the cart one end of the tail-board ordinarily fits, I provide a tail-board pin in the form of a vertical cam D, set at its bottom into one of the sills D' and at the top into one of the side raves $D^2$. This cam D may be made in the form of an eccentric cylinder, as shown, $d$ being its axis, and it is provided with a handle $d'$. Its cam-like construction and operation will be seen from Fig. 5, in which it is shown in two positions, its position in full lines binding the tail-board C against the rear edge of one side of the cart and its position in dotted lines showing it when turned so as to release the tail-board. At the other end of the tail-board I have also shown a cam arrangement for binding it against the rear edge of the cart. In this case, E is a shank having a hook $e$ at its outer end, which may be made either with a plane face, as shown in Fig. 1, or with a cam-shaped face, as shown in Fig. 6. Its shank is hung in eyes E' $E^2$, attached to the posts of the cart, and it is provided with a handle $E^3$. F is a block which, in the form shown in Figs. 1 and 2, is provided with a cam-surface, this surface being formed about an opening $f$ through the block and tail-board, suitably shaped and just large enough to pass over the hook $e$. It will be seen that on passing the opening *f* over the hook *e* and turning the hook by means of the handle E³, so that it will ride up on the cam-surface, the tail-board will be clamped tightly against the rear edge of the cart. The same result will take place if the hook is provided with a cam-surface, as shown in Fig. 6, in which case, however, the block F should have a plane surface. Another way of accomplishing this result is by so constructing the shank E and one of the eyes E' that a cam-surface will be formed, as shown at *e'*, Figs. 1 and 4. By turning the handle down the cam-surface will draw the shank back, so that the hook will bind the tail-board against the cart. The operation of putting this tail-board C in place is as follows: The cam D being open and the hook *e* being properly turned to pass through the opening *f*, one edge of the tail-board is slipped in behind the cam D and the opening *f* in the other end is slipped over the hook *e*. By turning the cam D into position shown in Fig. 5 it is caused to bind against the rear edge of the cart, and by turning the handle E in the same way its edge of the tail-board will be caused to bind against the rear edge of the cart, so that the water-tight joint may be formed.

The added expense of this construction is very slight, and on the other hand the value of this invention is very great, for it enables a cart to be built which is not only water-tight at the start, but with ordinary wear and tear will remain so for a very long time by reason of the fact that those portions of the cart which ordinarily are subjected to the greatest amount of wear and tear, due to the expansion and contraction under the varying conditions of dampness and dryness, are fully protected by strips which will not expand and contract under the same conditions, but which will allow the wooden portions to expand and contract as occasion may require. Moreover, by binding the tail-board to the rear edge of the cart by means of cams—for example, in the manner shown—a much tighter joint can be made than in any other way now known to me.

What I claim as my invention is—

1. A water-tight cart above described consisting of a wooden body grooved at its joints, each joint being provided with a metallic strip fitting into its groove flush with said wooden body and breaking joints therewith, all as and for the purposes set forth.

2. In a cart, a tail-board and a cam mechanism for holding one end thereof in place, said cam mechanism consisting of a shaft mounted horizontally on the side of the cart-body and having at its outer end a hook adapted to engage with a portion of said tail-board, one element of said cam mechanism being located on said hook and the other upon said tail-board whereby upon the rotation of said shaft it and said hook bind said tail-board against the end of said cart, as set forth.

3. In a cart, the tail-board-attaching mechanism above described consisting of two cam connections, one a vertical cam-shaped rod located on one side of the tail of the cart and adapted to form with the rear edge of the cart a slot into which one end of the tail-board may be set and adapted to be rotated whereby said end of the tail-board will be bound against the rear edge of the cart, the other cam mechanism consisting of a shaft mounted horizontally on the side of said cart and carrying a hook and bearing-surface for said hook located upon said tail-board, as and for the purposes set forth.

4. A cart having its floor dovetailed to receive a tail-board and a tail-board adapted to fit the dovetail in said cart-floor and mechanism consisting of two cams to bind said tail-board to said cart with a water-tight joint, one of said cams consisting of a vertical cam-shaped rod adapted to be rotated and form with the rear end of one side of the cart, a slot within which one end of the tail-board is set, and the other consisting of a hook mounted on the end of a shaft and adapted to be turned thereby and engage with a cam-surface on one end of the tail-board, all as set forth.

In testimony whereof I have hereunto set my name this 10th day of May, 1897.

ALBERT B. BLACK.

Witnesses:
GEORGE O. G. COALE,
E. A. GUILD.